United States Patent [19]

Ericsson

[11] Patent Number: 4,846,287
[45] Date of Patent: Jul. 11, 1989

[54] IMPACT APPARATUS

[76] Inventor: Rune Ericsson, S-791 46, Falun, Sweden

[21] Appl. No.: 146,140

[22] PCT Filed: May 14, 1987

[86] PCT No.: PCT/SE87/00243
§ 371 Date: Jan. 14, 1988
§ 102(e) Date: Jan. 14, 1988

[87] PCT Pub. No.: WO87/06870
PCT Pub. Date: Nov. 19, 1987

[30] Foreign Application Priority Data

May 14, 1986 [SE] Sweden ............................ 8602187
Nov. 14, 1986 [SE] Sweden ............................ 8604877

[51] Int. Cl.$^4$ ............................................ B23Q 5/033
[52] U.S. Cl. ............................................ 173/13; 29/253; 173/90
[58] Field of Search ............ 173/13, 15, 90, 121, 173/134; 91/424, 418; 29/253, 254; 269/97, 98, 246; 254/104; 279/1 E, 103, 1 B; 408/239 A; 144/251 A; 83/860, 397, DIG. 1; 227/8, 147

[56] References Cited

U.S. PATENT DOCUMENTS

| | | | |
|---|---|---|---|
| 2,292,520 | 6/1942 | Hokanson | 29/253 |
| 3,208,134 | 9/1965 | Krewson, Jr. | 254/104 |
| 3,273,657 | 9/1966 | Willems et al. | 173/15 X |
| 3,724,560 | 4/1973 | Tibbott | 173/15 X |
| 3,741,670 | 6/1973 | Wood | 408/92 |
| 3,848,502 | 11/1974 | O'Neill | 86/860 X |
| 3,954,276 | 5/1976 | Koniger et al. | 279/1 B X |

Primary Examiner—Frank T. Yost
Assistant Examiner—James L. Wolfe
Attorney, Agent, or Firm—Gifford, Groh, Sheridan, Sprinkle and Dolgorukov

[57] ABSTRACT

An impact apparatus, e.g. for moving portions (2, 3) of two elements (4, 5) away from each other by a wedge shaped tool (1), which is introducable between said portions, comprises a carrier (9), to which the tool is attached and which is movable relative to a body (10) of the apparatus. An impact member (11) is also movable relative to the body. A movement transmission device (12) acts between the carrier and a device (13) for activating such force influence on the impact member that it is caused to apply an impact on the carrier. The apparatus is so designed that when the carrier (9) is displaced due to actuation of the tool, the movement of the carrier is transferred via the transmission device to the activating device, which causes force influence on the impact member. The activating device (13) may be a valve for pressure fluid supply.

20 Claims, 4 Drawing Sheets

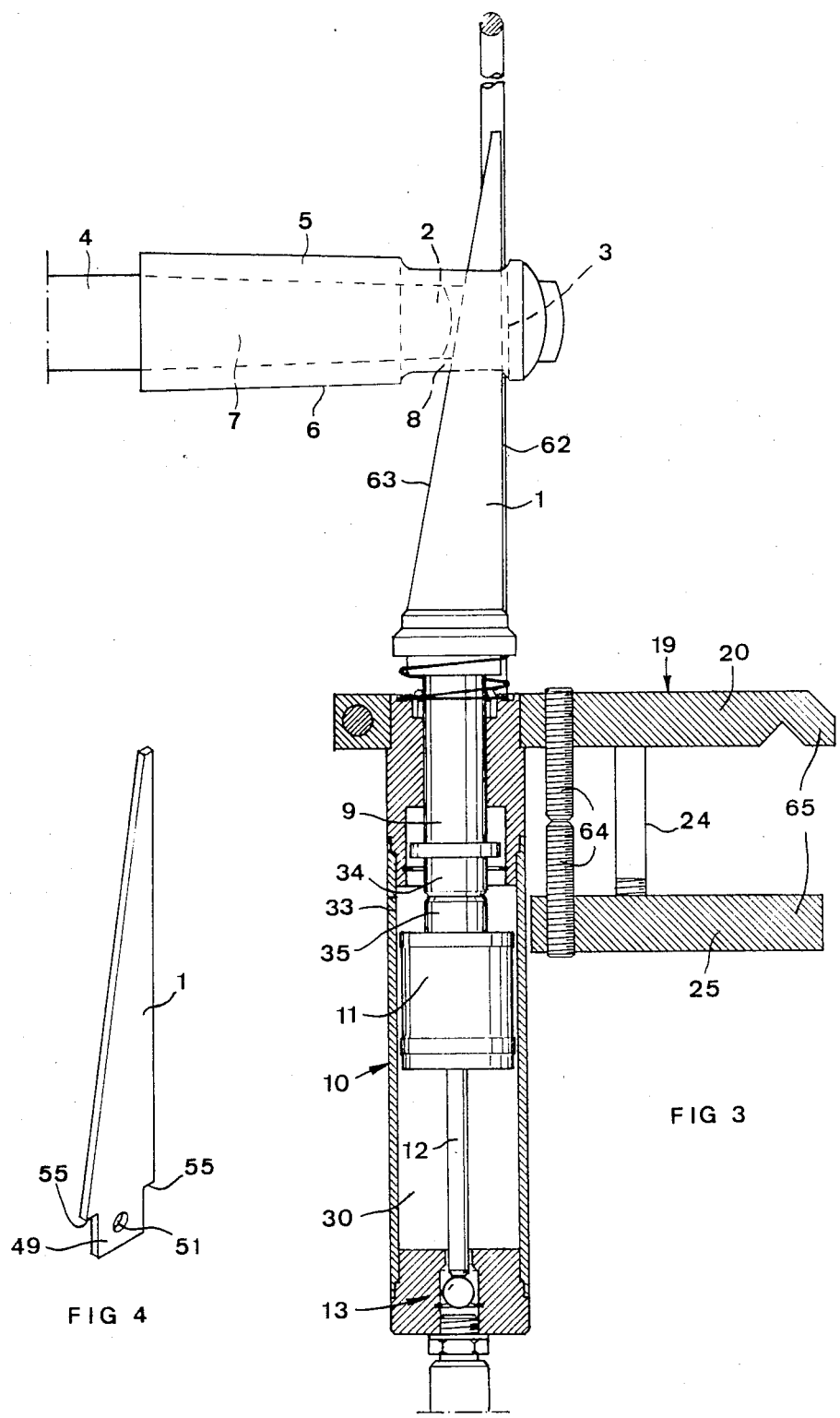

IMPACT APPARATUS

FIELD OF INVENTION AND PRIOR ART

This invention is related to an impact apparatus according to the preamble of claim 1. The apparatus may for instance be used for moving portions of two elements away from each other and comprises then a wedge like tool, which is introducable between said portions. The elements may in practice be consituted by tool elements, e.g. such which comprises conical surfaces interacting for locking purposes. The interlocking of the tool elements becomes as a rule very firm after some period of use, in particular if the conical surfaces during use are firmly pressed into engagement with each other. For the rest, the apparatus may be used in many instances, where impact application is required. As additional examples, it can be mentioned that the transfer member could be coordinated or designed with impact application members in the form of impact caps, punches, coining members, stamping members and the like. Generally speaking, the apparatus is intended for use for application of impacts on work pieces within the mechanical field, in particular mechanical work shops and the mechanical industry.

Many other impact apparatus within this field are previously known. However, they suffer from the disadvantage of either requiring manual activation of the impact operation by means of particular operating members or providing a deficient coordination of impact application with the impact need.

In U.S. Pat. No. 3,273,657, an impact apparatus according to the preamble of claim 1 is disclosed, but this apparatus is intended for immobilization and slaughter of animals and designed for producing impacts with a constant impact energy.

SUMMARY OF THE INVENTION

The object of the present invention is to provide an impact apparatus which is so designed that the operator without having to manipulate control components or the like can determine the impact force produced by the apparatus by varying the application of the impact apparatus and the work piece against each other.

This object is achieved in accordance with the invention by the features defined in the characterizing portion of claim 1. Accordingly, if the impact apparatus and the work piece are applied relatively carefully against each other an impact with a relatively low energy is obtained. If however the impact apparatus and the work piece are applied more forcefully or rapidly against each other, an impact is obtained with a higher energy. In this way, the operator may control impact force application in an extremely simple way.

Further advantageous designs of the apparatus are subject of the dependent claims.

BRIEF DESCRIPTION OF THE DRAWINGS

With reference to the appended drawings, a more specific disclosure of an embodiment example according to the invention follows hereinafter.

In the drawings:

FIG. 3 is a section perpendicular to the section in FIG. 2 and illustrating the apparatus just at the time for exerting an impact;

FIG. 4 is a perspective view of the wedge tool; and

DETAILED DISCLOSURE OF A PREFERRED EMBODIMENT

The impact apparatus will hereinafter be exemplified as used with a certain type of tool. However, the impact apparatus may be used in any connection where impact exertion is required with other types of tools.

Figure 1:
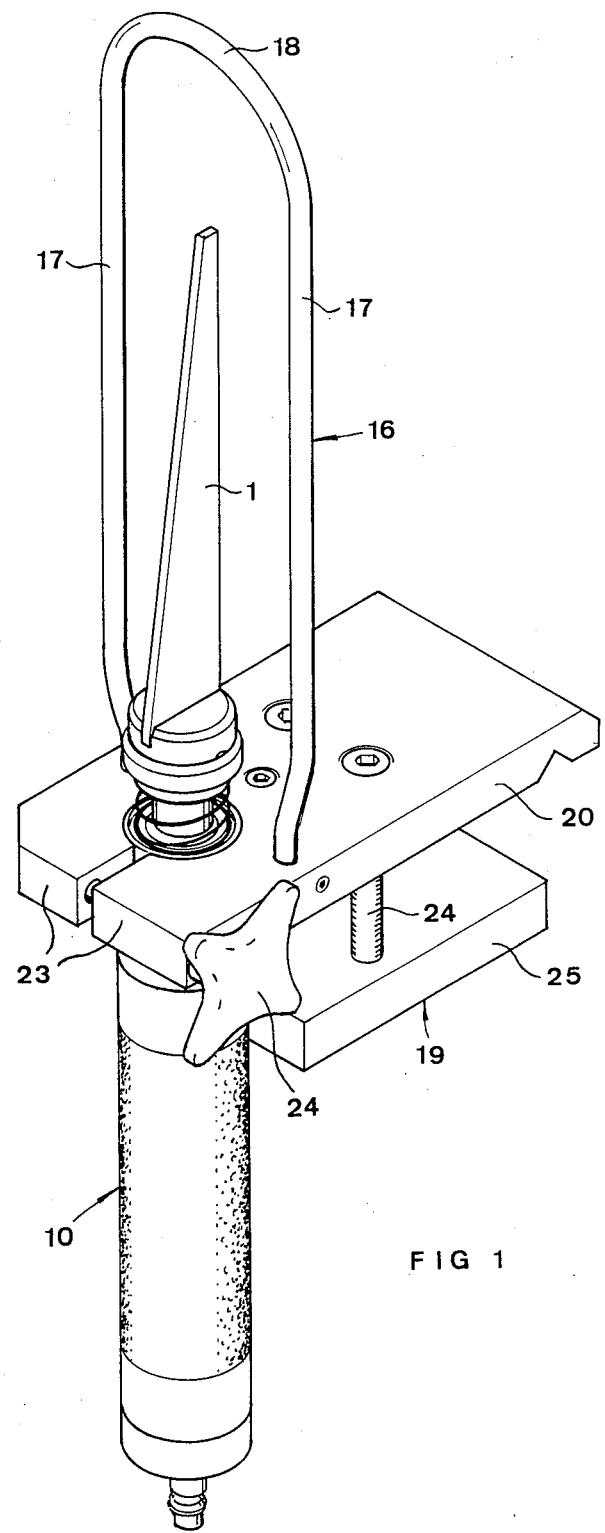
FIG. 1 is a perspective view of the apparatus.

As appears from FIGS. 1 and 3, the apparatus according to the invention comprises a wedge like tool 1 introducable between portions 2, 3 of two elements 4, 5. These elements are preferably constituted by tool elements. The tool element 4 may at its left, omitted end carry working members, such as cutting edges for boring, milling etc. The tool element 5 may serve for securing element 4 in an associated machine and may present an exteriorly conical surface 6 fitting in a corresponding female conical recess in the machine. The elements 4 and 5 may be secured to each other by the element 4 comprising a male conical part 7 fitting into an interiorly conical recess in element 5. Extending through element 5, there is a transversal passage 8, which partly is delimited by portion 3 of element 5 whereas portion 2 of element 4 is adapted to be located in passage 8 when elements 4 and 5 are in mutual engagement. Thus, by forcibly introducing the wedge tool 1 between portions 2 and 3, elements 4 and 5 can be separated from each other.

The apparatus comprises an impact transfer member in the form of a carrier 9, to which tool 1 is secured and which is movable relative to a body 10 of the apparatus. An impact member 11 is likewise movable relative to body 10. A movement transmission device 12 acts between carrier 9 and a device 13 for activating such force influence on impact member 11 that it carries out a movement and exerts an impact on carrier 9. Means 14, 15 are provided for affecting carrier 9 and impact member 11 to the starting position illustrated in FIG. 2 after the impact member having been caused to exert an impact. The apparatus is designed such that when carrier 9 is displaced due to actuation of tool 1 into a position between portions 2, 3, the movement of the carrier is transferred via the transmission device 12 to the activating device 13, which causes force influence on impact member 11. The carrier 9 is movable reciprocatingly relative to body 10 in a rectilinear path of movement. Body 10 is connected to an U-shaped or yoke like protective device 16, which has two mutually separated legs 17 extending along tool 1 on either sides thereof and a base 18 interconnecting the legs located spaced from and generally opposite to the tip of tool 1. The base 18 may have a curved shape with the concave side facing towards the tip of tool 1. The carrier 9 is, in a way which will be described more closely hereinafter, prevented from turning relative to body 10 and relative to protective device 16, tool 1 tapering in a plane generally perpendicular to the plane of the U.

The free ends of legs 17 are received in holes in a holder 19, and secured by e.g. locking screws. Body 10 is securable to a plate like portion 20 of holder 19. Plate 20 comprises a hole 21 for receiving a portion 22 (see also FIG. 2) of body 10. Portions of plate 20 taking part in delimiting hole 21 have the character of shanks 23 being free from each other. These shanks may be pressed towards each other by means of a screw device operable by means of an operating member 24 in order to press the limiting surface of hole 21 against portion 22 of body 10.

The plate 20 is by means of screws 24 connected to a further plate 25 contained in the holder such that the holder by tightening of screws 24 may be secured to a machine portion becoming clamped between plate 20 and 25.

Also impact member 11 is movable reciprocatingly relative to body 10 in a generally rectilinear path of movement. Transmission device 12 comprises a rod, which at one end thereof, the upper in FIG. 1, is adapted to contact carrier 9 and which protrudes through an axial hole 26 in the impact member. The other end, denoted 28, of rod 12 is adapted for actuation of the activating device 13.

A spring 14 is arranged to tend to move carrier 9 and impact member 11 away from each other. This spring is constituted by a screw spring arranged about the rod 12. As appears from FIG. 2, rod end 27 extends into a recess in carrier 9 and abuts against the bottom of the recess. The same applies for the spring 14. The hole 26 in impact member 11 has a portion with a large diameter and a portion with a smaller diameter, a shoulder 29 being formed at the transition between said portions, spring 14 taking support against said shoulder. In the starting or rest position in FIG. 2, the spring 14 is subject to a certain pretensioning.

The impact member 11 is a pressure fluid driven piston whereas the activating device 13 is a valve device for controlling pressure fluid supply into a working chamber 30 located within the body 10 designed as a cylinder on the side of the impact piston facing away from carrier 9. Carrier 9 and impact piston 11 move parallel to each other and are preferably concentric.

The valve device 13 comprises a valve body 31 in the form of a ball actuatable by rod 12, said valve body cooperating with a valve seat 32 such that small or slow movement of the valve body away from its seat by means of rod 12 causes a relatively great pressure drop over or past valve device 13 such that pressure fluid relatively slowly flows into working chamber 30 and the impact piston 11 is caused to exert an impact on carrier 9 with a relatively low intensity, whereby, as appears from FIG. 3, a portion 33 of the impact piston hits upon a portion 34 of carrier 9. However, when valve body 31 is imparted a greater or more rapid movement in a direction away from its seat, the pressure drop over or past the valve device will be smaller, whereby pressure fluid more rapidly flows into working chamber 30 and impact piston 11 exerts an impact with a higher intensity.

The cylinder 10 and impact pistion 11 delimits on the other side of the impact piston a second chamber 35, which via one or more openings 36 communicates with fluid at a relatively low pressure. The impact piston 11 is so designed that when the piston, after having carried out an impact, is affected to its starting position in FIG. 2 by spring 14 and/or gravitation, fluid in working chamber 30 may flow past impact piston 11 to chamber 35. This flow may occur between piston 11 and cylinder 10 or between piston 11 and rod 12 or both. Thus, piston 11 adjoins with a certain clearance to cylinder 10 and-/or rod 12. However, the clearance should not be greater than so as to maintain flow past piston 11 upon pressurization of working chamber 30 at a subordinated importance.

Figure 5:
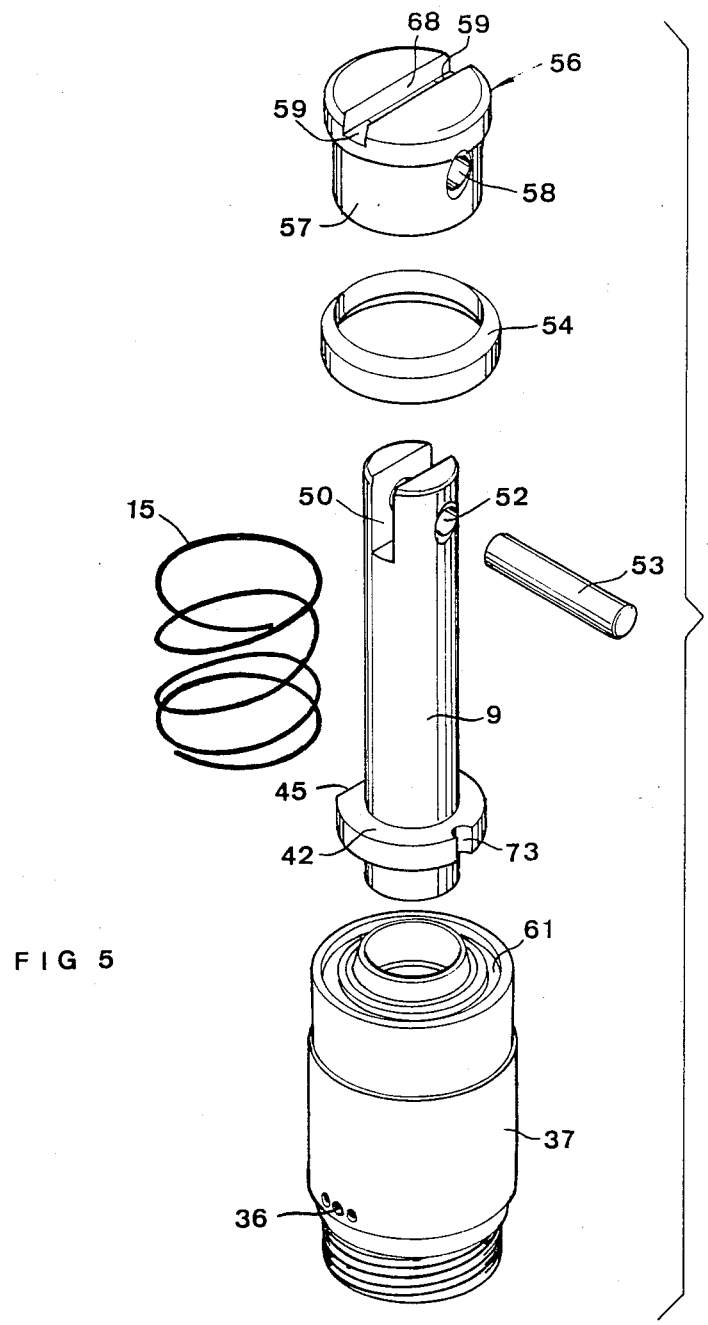
FIG. 5 is an exploded view illustrating the device for securing the wedge tool to its carrier.

The cylinder 10 is in practice formed by three parts, namely two end pieces 37, 38 and a tubular piece 39 located therebetween and being by e.g. threads in engagement with end pieces 37, 38. The end piece 37 has a through hole with two portions having a different diameter and a shoulder located in the transition therebetween. The hole portion having the smaller diameter is the outermost located and allows carrier 9 to protrude with its extreme end out of end piece 37, which comprises a seal 41 adjoining to carrier 9. The latter has a flange 42 with such a width that it may obtain support against shoulder 40 and accordingly limit the movement of carrier 9 in a direction out of cylinder 10. A locking member 43 in the form of a circular rod protrudes partially into an axially extending recess in the internal wall of the hole portion of end piece 37 having the larger diameter and this locking member is partly received in a seat 73 (FIG. 5) in the flange 42 of carrier 9. In the hole portion of end piece 37 having the larger diameter, there is furthermore a seat for receiving a locking ring 44, which holds the locking member 43 in place and forms a stop for the movement of carrier 9 into cylinder 10 by contacting flange 42. Thus, the locking member 43 forms a means for preventing turning of carrier 9 relative to end piece 37 but allows movement of carrier 9 reciprocatingly relative to cylinder 10. As appears from FIG. 5, flange 42 has a cut away 45 allowing fluid to flow between chamber 35 and openings 36 also when flange 42 is located opposite to or below openings 36 as the device is viewed in FIG. 2.

End piece 38 has a through passage 46, the limiting wall of which at the end located inwardly in the cylinder 10 is designed for forming valve seat 32. A locking ring 47 may be introduced into passage 46 for limiting movement of valve ball 31 away from seat 32. A nipple 48 is introduced into the outer end of the passage for connection to a pressure fluid supply conduit.

It is preferred to power the apparatus with pressurized gas, in practice pressurized air. In such a case, the openings 36 may simply communicate with the surrounding atmosphere.

The tool 1 comprises a portion 49 introducable into a seat 50 of carrier 9, said portion 49 comprising a hole or seat 51. Also carrier 9 comprises a hole 52. This extends through two shanks of the outer end of carrier 9, said shanks delimiting seat 50. A pin 53 is introducable into these holes 51, 52. A locking ring 54 is movable relative to the carrier in its direction of movement between a first position, in which the locking ring entirely or partially overlaps holes 51, 52 and is capable of maintaining pin 53 therein, and a second position, in which holes 51, 52 are made free and pin 53 may be taken away.

As appears from FIG. 4, portion 49 of tool 1 has a reduced width so as to form shoulders 55 on either sides thereof. In the embodiment, pin 53 secures to carrier 9 a part 56, which in practice can be considered to form an intergrated part of carrier 9. This part 56 has a circular mantle 57 overlapping about the end of carrier 9 comprising seat 50 and in this mantle holes 58 are provided, through which pin 53 extends. The part 56 has at the top thereof a groove 68 and this groove has at its ends bottom surfaces 59, against which the shoulders 55 of tool 1 may support. The exterior surface of mantle 57 of part 56 forms an axial guide surface for locking ring 54, the internal diameter of which accordingly is slightly larger than the external diameter of mantle 57.

Figure 2:
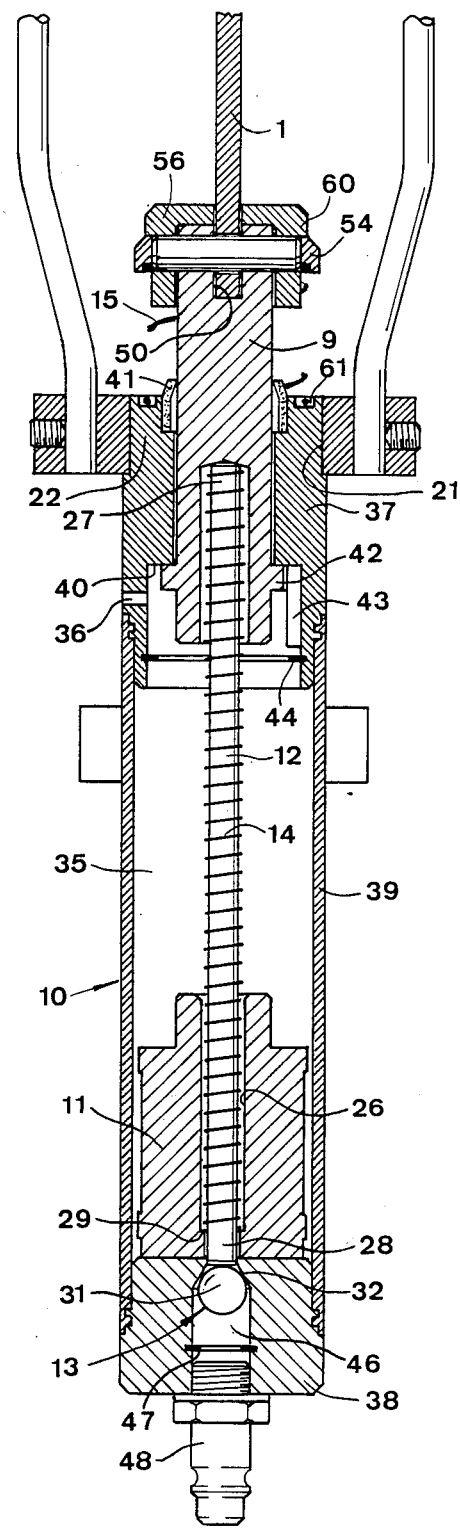
FIG. 2 is a section through the apparatus viewed in its starting position.

The spring 15 affects the locking ring 54 to its locking position illustrated in FIG. 2, in which ring 54 obtains support in a direction upwardly against a flange 60 on part 56 protruding slightly outside the external surface of mantle 57. The spring 15 is constituted by a screw pressure spring, one end of which abuts against locking ring 54 and the other end of which abuts the end face of end piece 37. In said end face, a groove 61 may be provided for receiving the end of the spring. Thus, spring 15 will affect the locking ring 54 and accordingly part 56 and carrier 9 upwardly in FIG. 2, i.e. spring 15 assists in maintaining carrier 9 in its starting or rest position. When it is desired to change tool 1, locking ring 54 is moved downwardly in FIG. 2 so that pin 53 may be removed from holes 51, 52 and 58. Thereafter, the tool 1 may be removed and replaced by another tool, whereafter pin 53 is reintroduced and locking ring 54 allowed to resume the position according to FIG. 2.

It is normally preferable that the tool 1, as appears from FIG. 3, while viewing tool 1 in such an angle that its wedge form appears, has a wedge edge 62 generally parallel to the direction of movement of carrier 9 and a second wedge edge 63 inclined in relation thereto such that edges 62 and 63 converge in a direction towards the outermost end of tool 1.

It is intended that the ends of plates 20 and 25 appearing to the right in FIG. 3 are to be caused to clamp a part of for instance a machine or other object between each other for securing holder 19 thereto. In order to adjust the distance between plates 20 and 25 members 64 are provided, which may have the form of two screws 64 each engaging with one of plates 20 and 25, more specifically with a threaded hole therein. The ends of screws 64 are intended to abut each other in order to limit the distance. These screws 64 are located adjacent cylinder 10 and spaced from the clamping edge portions 65 of plates 20 and 25. Furthermore, screws 64 are located opposite to a center portion of edges 65. The tightening screws 24 are in the embodiment two in number and are located between screws 64 and edge portions 65. The described arrangement allows, on tightening of screws 24, a certain inclination between plates 20 and 25.

OPERATION OF THE APPARATUS

Two tool elements 4, 5 to be removed from each other are sidewardly moved into the space between the tip of tool 1 and base 18 of the yoke 16. It is preferred that the operator with one hand holds tool element 4 and with the other hand the outer end of the other element 5. Thereafter, the operator moves the elements 4, 5 downwardly so that tool 1 enters in between portions 2 and 3. By means of tool 1, carrier 9 is pressed downwardly in cylinder 10 and this causes via rod 12 the valve ball 31 to be moved away from its seat 32. Pressurized air may now flow past ball 31 and seat 32 into working chamber 30, which causes impact piston 11 to be moved towards carrier 9 and apply an impact thereon. This moment is illustrated in FIG. 3. Tool 1 is thereby hammered upwardly and tends to move portions 2 and 3 away from each other.

When carrier 9 moves upwardly, the pressurized air influence on valve ball 31 causes the same to resume its position against seat 32 so as to make pressurized air supply to working chamber 30 to cease. During movement of impact piston 11 air in chamber 35 is evacuated via openings 36. The spring 14 has been tensioned during movement of impact piston 11 and after the application of the impact, this spring affects the impact piston 11 in a direction towards the starting position in FIG. 2 and simultaneously also carrier 9 to its starting position, which is assisted by spring 15. During this return movement of impact piston 11 air located within working chamber 30 flows past piston to chamber 35. If the impact would not have released elements 4, 5 from each other, the described operation can be repeated. The more firmly or more rapidly the operator presses the elements 4, 5 downwardly, the more will valve ball 31 be moved away from its seat 32 and the smaller will the pressure drop past the valve device 13 be and accordingly the higher will the energy of the impact of the impact piston be.

CONCEIVABLE MODIFICATIONS OF THE INVENTION

The impact piston 11 may not necessarily have to exert an impact directly on carrier 9; some kind of intermediate part could accordingly be arranged. Furthermore, rod 12 may not have to be arranged to directly actuate valve device 13; thus, the transmission device could also consist of two or more parts instead of the illustrated rod 12. Furthermore, other types of valve bodies, e.g. disc valves etc, may be used instead of a valve ball 31. The cylinder 10 and tool 1 of the apparatus may not necessarily have to be used in combination with the illustrated holder 19 and yoke 16. Thus, the cylinder 10 with associated tool 1 removed from holder 19 may be used for separating elements, which, e.g. by being secured in a machine, only are accessible by making cylinder 10 and tool 1 free for movement and adjustment as desired, e.g. horisontally or in other directions than vertical. Thus, the operator can in such a case hold the cylinder 10 and apply wedge tool 1 against the stationary elements, the impact operation being otherwise analogous to the previously described. Also other modifications are possible within the scope of the invention. Instead of a locking member in the form of a pin 53, one or more balls could for instance be received in cavities in carrier 9, whereby at least some of these balls in locking position could cooperate with seats on or in the tool and be prevented from disengaging from a locking cooperation with the tool by locking ring 54. Finally, two or more valve bodies could be arranged for operation in series in order to achieve application of varying impact forces.

I claim:

1. An impact apparatus of the kind comprising at least two members (9, 11) movable relative to a body (10) of the apparatus, namely an impact member (11) and a transfer member (9), said impact member (11) being adapted to be subjected to such force that it carries out a working movement and applies impact, directly or indirectly, on the transfer member, which is adapted to directly or via a suitable impact application member (1) transfer the impact force to a work piece, a movement transmission device (12) acting between the transfer member (9) and a device (13) for activating force application on the impact member (11) whereby, when the transfer member (9) is displaced due to actuation of the transfer member (9) or its impact application member against the work piece, the transmission device (12) causes actuation of the activating device, which causes force application on the impact member, said impact member (11) being pressure fluid driven and said activating device being a pressure fluid valve device (13) having at least one valve body (31) adapted to close and open respectively at least one passage intended for pressure fluid supply for driving the impact member, characterized in that the valve body (31) of said valve device, being directly or indirectly actuatable by the transmission device (12), is adapted to cause, upon slight or slow movement of the valve body from its closing position by means of the transmission device, a relatively great pressure drop over the valve device and accordingly a relatively low velocity and impact energy of the impact member whereas greater or more rapid movement of the valve body causes a higher velocity and impact energy of the impact member.

2. An apparatus according to claim 1, characterized in that the transfer member (9) has the character of a carrier for a wedge tool (1) adapted for moving portions (2, 3) of two elements (4, 5) away from each other by introduction of the tool between said portions, the carrier (9) is movable reciprocatingly relative to the body (10) in a generally rectilinear path of movement, the body is connected to or comprises a rigid U-shaped protective device (16), having two mutually spaced legs (17) extending along the tool (1) on either sides thereof and a base (18) connecting the legs and located spaced from and generally opposite to the tip of the tool, the carrier (9) is prevented from turning relative to the body (10) and the U-shaped protective device (16), and the tool (1) tapers in a plane generally perpendicular to the plane of the U.

3. An apparatus according to claim 2, characterized in that the protective device (16) is secured in a holder (19), to which the body (10) is removably attached.

4. An apparatus according to claim 2, characterized in that said wedge (1) comprises a planar blade having one substantially straight first edge and one sloping second edge.

5. An apparatus according to claim 1, characterized in that the transfer member (9) and impact member (11) are movable reciprocatingly relative to the body (10) in a generally rectilinear path of movement and that the transmission device comprises a rod (12), which at one end (27) thereof is adapted to be actuated, directly or indirectly, by the transfer member (9), protrudes through an axial hole (26) in the impact member (11) and which at its other end (28) is adapted to actuate, directly or indirectly, the activating device (13), said rod being movably arranged relative to the transfer member.

6. An apparatus according to claim 5, characterized by means for actuating the transfer member (9) and impact member (11) to a starting position after the impact member having been caused to apply an impact, said means comprising at least one spring (14) tending to move the transfer member and impact member away from each other, said spring being constituted by a screw spring arranged about the rod.

7. An apparatus according to claim 5, characterized in that said transfer member (9) has an application member holding end and a movement transmission device receiving end, said movement transmission device receiving end having a recessed region defined therein for slidably receiving said movement transmission device (12).

8. An apparatus according to claim 1, characterized in that the impact member is a piston (11) whereas the valve device (13) is adapted for controlling the pressure fluid supply into a working chamber (30) located within the body (10) designed as a cylinder on one side of the impact piston.

9. An apparatus according to claim 8, characterized in that the cylinder (10) on the other side of the impact pistion has a second chamber (35), which via at least one opening (36) communicates with fluid at a relatively low pressure, and that the impact piston (11) is designed so as to allow fluid in the working chamber to flow past the impact piston to said second chamber when the impact piston is actuated to its starting position after having carried out an impact.

10. An apparatus according to claim 1, characterized in that the valve body (31) comprises a ball, said ball being movably seatable against a valve seat (32) defined in a passage (46).

11. An apparatus according to claim 1, characterized in that the impact application member in the form of a tool (1) comprises a portion (49) for coordination with a portion of the transfer member (9), said former portion comprising at least one seat (51), that the transfer member (9) comprises at least one cavity (52), that a locking member (53) is adapted to be simultaneously received in said seat and said cavity of the tool and the transfer member respectively so as to interlock them, that a locking ring (54) is axially movable relative to the transfer member between a first position, in which the looking ring overlaps the cavity of the transfer member and retains the locking member in its position for interlocking the transfer member and the tool, and a second position, in which the locking member is free to disengage from the seat (51) of the tool a spring (15) acting between the body (10) and the locking ring (54) to actuate the latter to retain it in its first position relative to the transfer member as well as to actuate the transfer member via said locking ring to a starting or rest position relative to the body.

12. An impact apparatus of the kind comprising at least two members (9, 11) movable relative to a body (10) of the apparatus, namely an impact member (11) and a transfer member (9), said impact member (11) being adapted to be subjected to such force that it carries out a working movement and applies impact, directly or indirectly, on the transfer member, which is adapted to directly or via a suitable impact application member (1) transfer the impact force to a work piece, a movement transmission device (12) acting between the transfer member (9) and a device (13) for activating force application on the impact member (11), whereby when the transfer member (9) is displaced due to actuation of the transfer member (9) or its impact application member against the work piece, the transmission device (12) causes actuation of the activating device, which causes force application on the impact member, said impact member (11) being pressure fluid driven and said activating device being a pressure fluid valve device (13) having at least one valve body (31) adapted to close and open respectively at least one passage intended for pressure fluid supply for driving the impact member, wherein the transfer member (9) has the character of a carrier for a wedge tool (1) adapted for moving portions (2, 3) of two elements (4, 5) away from each other by introduction of the tool between said portions, the carrier (9) is movable reciprocatingly relative to the body (10) in a generally rectilinear path of movement, the body is connected to or comprises a U-shaped, rigid protective device (16), having two mutually spaced legs (17) extending along the tool (1) on either sides thereof and a base (18) connecting the legs and located spaced from and generally opposite to the tip of the tool, the carrier (9) is prevented from turning relative to the body (10) and the U-shaped protective device (16), and the tool (1) tapers in a plane generally perpendicular to the plane of the U.

13. An apparatus according to claim 12, wherein the protective device (16) is secured to a holder (19), to which the body (10) is removably attached.

14. An apparatus according to claim 12, wherein the valve body (31) of said valve device, being directly or indirectly actuatable by the transmission device (12), is adapted to cause, upon slight or slow movement of the valve body from its closing position by means of the transmission device, a relatively great pressure drop over the valve device and accordingly a relatively low velocity and impact energy of the impact member whereas greater or more rapid movement of the valve body causes a higher velocity and impact energy of the impact member.

15. An impact apparatus of the kind comprising at least two members (9, 11) movable relative to a body (10) of the apparatus, namely an impact member (11) and a transfer member (9), said impact member (11) being adapted to be subjected to such force that it carries out a working movement and applies impact, directly or indirectly, on the transfer member, which is adapted to directly or via a suitable impact application member (1) transfer the impact force to a work piece, a movement transmission device (12) acting between the transfer member (9) and a device (13) for activating force application on the impact member (11), whereby when the transfer member (9) is displaced due to actuation of the transfer member (9) or its impact application member against the work piece, the transmission device (12) causes actuation of the activating device, which causes force application on the impact member, said impact member (11) being pressure fluid driven and said activating device being a pressure fluid valve device (13) having at least one valve body (31) adapted to close and open respectively at least one passage intended for pressure fluid supply for driving the impact member, wherein the transfer member (9) and impact member (11) are movable reciprocatingly relative to the body (10) in a generally rectilinear path of movement and the transmission device comprises a rod (12), which at one end (27) thereof is adapted to be actuated, directly or indirectly, by the transfer member (9), protrudes through an axial hole (26) in the impact member (11) and which at its other end (28) is adapted to actuate, directly or indirectly, the activating device (13), said transfer member being movably arranged relative to said rod.

16. An apparatus according to claim 15, wherein means for actuating the transfer member (9) and impact member (11) to a starting position after the impact member having been caused to apply an impact, comprises at least one spring (14) tending to move the transfer member and impact member away from each other, said spring being constituted by a screw spring arranged about the rod and acting with its ends on the transfer member and the impact member respectively, said rod being movable within said spring.

17. An apparatus according to claim 15, wherein the valve body (31) of said valve device, being directly or indirectly actuatable by the transmission device (12), is adapted to cause, upon slight or slow movement of the valve body from its closing position by means of the transmission device, a relatively great pressure drop over the valve device and accordingly a relatively low velocity and impact energy of the impact member whereas greater or more rapid movement of the valve body causes a higher velocity and impact energy of the impact member.

18. An apparatus according to claim 17, wherein the valve body (31) comprises a ball, said ball being movably seatable against a valve seat (32) defined in a passage (46).

19. An impact apparatus of the kind comprising at least two members (9, 11) movable relative to a body (10) of the apparatus, namely an impact member (11) and a transfer member (9), said impact member (11) being adapted to be subjected to such force that it carries out a working movement and applies impact, directly or indirectly, on the transfer member, which is adapted to directly or via a suitable impact application member (1) transfer the impact force to a work piece, a movement transmission device (12) acting between the transfer member (9) and a device (13) for activating force application on the impact member (11), whereby when the transfer member (9) is displaced due to actuation of the transfer member (9) or its impact application member against the work piece, the transmission device (12) causes actuation of the activating device, which causes force application on the impact member, said impact member (11) being pressure fluid driven and said activating device being a pressure fluid valve device (13) having at least one valve body (31) adapted to close and open respectively at least one passage intended for pressure fluid supply for driving the impact member, wherein the impact application member in the form of a tool (1) comprises a portion (49) for coordination with a portion of the transfer member (9), said former portion comprising at least one seat (51), the transfer member (9) comprising at least one cavity (52), a locking member (53) being adapted to be simultaneously received in said seat and said cavity of the tool and the transfer member respectively so as to interlock them, a locking ring (54) being axially movable relative to the transfer member between a first position, in which the locking ring overlaps the cavity of the transfer member and retains the locking member in its position for interlocking the transfer member and the tool, and a second position, in which the locking member is free to disengage from the seat (51) of the tool, a spring (15) acting between the body (10) and the locking ring (54) to actuate the latter to retain it in its first position relative to the transfer member as well as to actuate the transfer member via said locking ring to a starting or rest position relative to the body.

20. An apparatus according to claim 19, wherein the spring (15) is a compression screw spring arranged about a portion of the transfer member externally of the body (10).

* * * * *